UNITED STATES PATENT OFFICE.

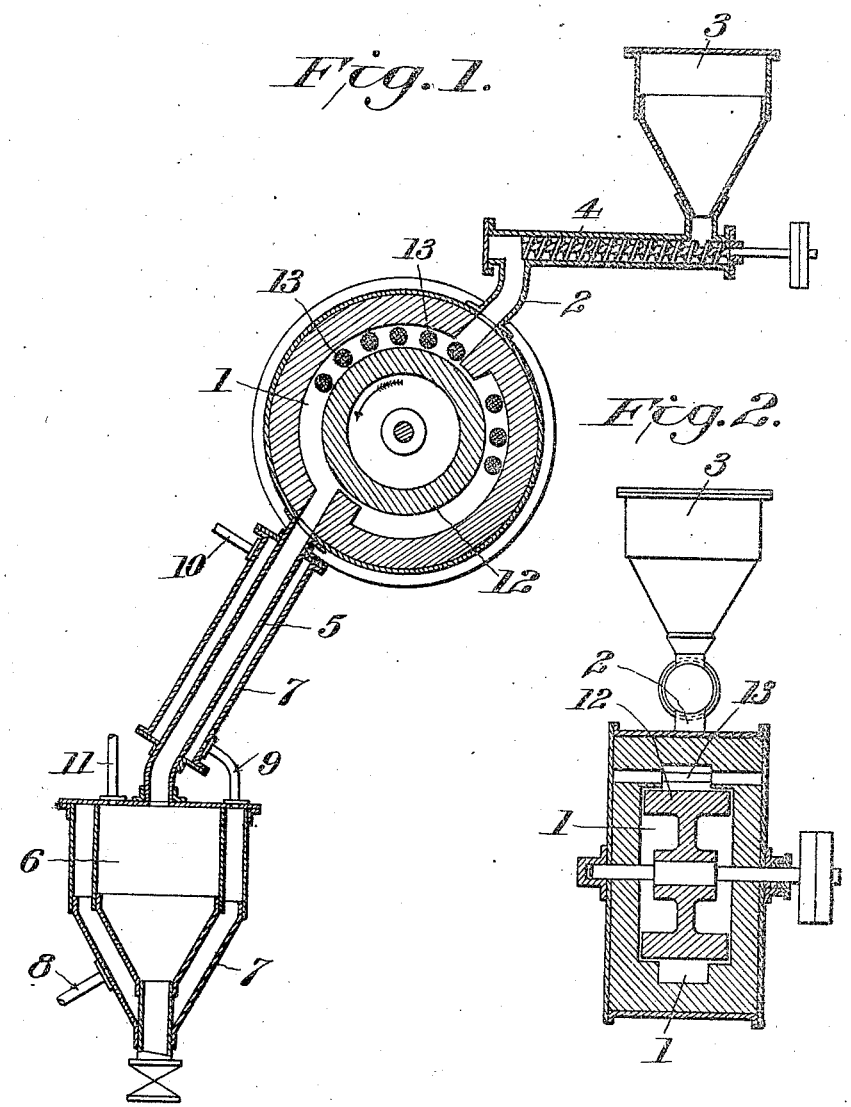

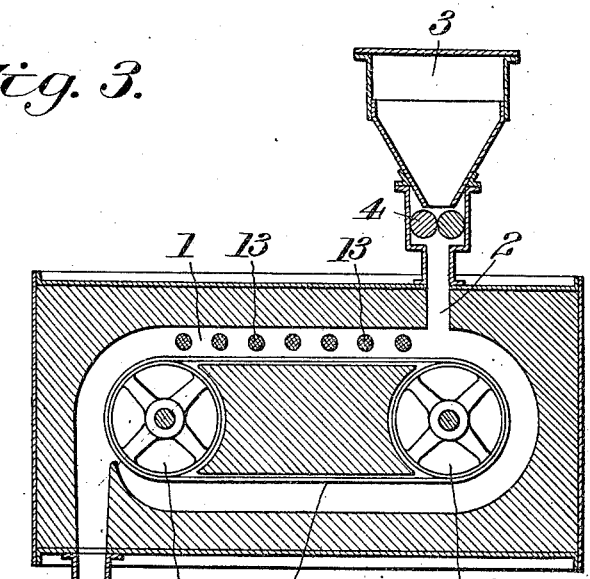
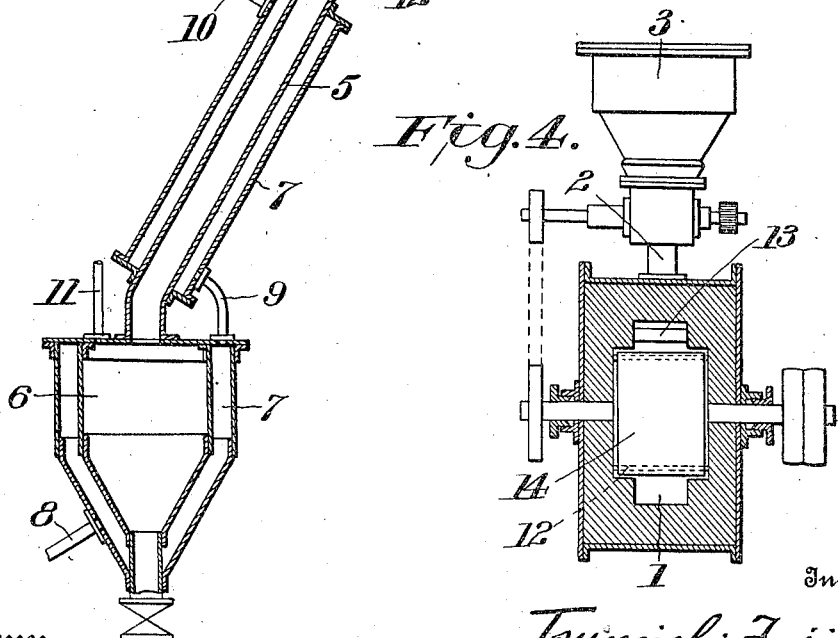

TSUNEICHI FUJIYAMA, OF TOKYO, JAPAN.

APPARATUS FOR MANUFACTURING NITROGEN COMPOUNDS.

1,090,391.  Specification of Letters Patent.  Patented Mar. 17, 1914.

Application filed April 12, 1913. Serial No. 760,699.

*To all whom it may concern:*

Be it known that I, TSUNEICHI FUJI-YAMA, a subject of the Emperor of Japan, residing at No. 116 Aoyama-minami-machi, 6 Chome, Akasaka-ku, Tokyo, Japan, have invented certain new and useful Improvements in Apparatus for Manufacturing Nitrogen Compounds, of which the following is a specification.

This invention relates to apparatus for manufacturing nitrogen compounds from carbid or its constituents by the action of nitrogen, and consists in providing a roller in a nitrogen-chamber so heated as to make it fit for chemical re-action, and in supplying carbid or its constituents upon the roller or an endless belt wound over two separate rollers and thus in making said material absorb nitrogen while it, due to the rotation of the roller or to the traveling of the belt, is moving in the chamber, and has for its object not only to produce the refined nitrogen compound, but also to make the process continuous.

In the accompanying drawings:—Figure 1 shows a vertical section of an apparatus embodying this invention; Fig. 2, a transverse section of the nitrogen chamber; Fig. 3, a vertical section of a modification; Fig. 4, a transverse section of the form of nitrogen chamber shown in Fig. 3.

Similar letters refer to similar parts throughout the several views.

In the invention, a chamber for nitrogen is made of fire-proof material, cylindrical and tightly closed, and material consisting of carbid or its constituents is dropped into it from the upper side of the chamber through pipe (2), the material stored in receptacle (3) being first transmitted to conveyer (4) which opens to said pipe (2), and then through discharge pipe (5) provided at the lower side of the chamber. The refined product of nitrogen compound is made to drop down into receiver (6). The discharge pipe (5) and receiver (6), are respectively jacketed over to let water in, the jacket being provided with feed pipe (8) connecting pipe (9), and exhaust pipe (10), and cool water is constantly fed therein. Receiver (6) is made to supply nitrogen, which it receives from feed pipe (11) connecting therewith, to the chamber (1) by means of discharge pipe (5).

In the chamber (1), roller (12) made of fire-proof material is rotatably mounted, and in the space between the inner wall of the chamber (1) and roller (12), carbon rods capable of producing electric arcs, or carbon resistors are arranged in an annular series, and the chamber is so heated as to make it fit for chemical re-action in the production of nitrogen compounds, and then the material is dropped down on roller (12) by pipe (2) and is made to fully absorb nitrogen while it is moving in the chamber by the rotation of the roller, thus forming the refined product as afore-mentioned.

In this invention, it is also possible to modify the arrangement, as shown in Figs. 3 and 4. In the modification, an enlarged chamber is used, a pair of rollers (12) (12) are rotatably mounted in it, an endless belt (14) is wound over them to make it travel around in the chamber, and the material is made to drop down on said belt (14) through pipe (2) and it absorbs nitrogen while it is moving in the chamber, due to the rotation of the rollers, in the same manner as with the apparatus shown in Figs. 1 and 2. Further in this invention, as the roller is rotatably mounted in a nitrogen-chamber electrically heated so as to make it fit for chemical re-action, and the material is dropped thereon to transform it into a nitrogen compound while it is moving in the chamber by the rotation of the roller, all as stated before, therefore the manufacture is carried on continuously, and also as the material charged on the roller or the belt forms a thin layer, it is all evenly heated, and will be likely to perfectly contact with the nitrogen, and consequently to absorb it more completely.

When the product containing nitrogen compounds is left under high heat for a long time, it may decompose back into the original material, but in this invention, as the product is removed from the high heat as soon as the material has once absorbed nitrogen, no such action can take place.

Having thus described my invention, what I claim as new and desire to secure by Letters Patent is:—

1. Apparatus for producing nitrogen compounds comprising a closed chamber, a traveling support in said chamber, said support being spaced from the walls of the chamber, electric heating means in such space, means for feeding material to be treated onto said support and means for causing a current of nitrogen to flow over such material.

2. Apparatus for producing nitrogen compounds comprising a closed chamber, a traveling support in said chamber, said support being spaced from the walls of the chamber, electric heating means in such space, means for feeding material to be treated onto said support in a thin layer; and means for causing a stream of nitrogen to flow through said chamber over the thin traveling layer of heated material.

3. Apparatus for producing nitrogen compounds comprising a closed chamber, a traveling support in said chamber, said support being spaced from the walls of the chamber, electric heating means in such space, means for feeding material to be treated onto said support, means for cooling the material as it is discharged from said chamber, and means for causing a current of nitrogen to flow over such material during its travel.

4. Apparatus for producing nitrogen compounds comprising a closed chamber, a traveling support in said chamber, said support being spaced from the walls of the chamber, electric heating means in such space, means for feeding material to be treated onto said support, a discharge conduit extending from said chamber, a cooling jacket surrounding said discharge conduit, and means for causing a current of nitrogen to flow up through said discharge conduit and over the material being treated.

In testimony whereof I affix my signature in presence of two witnesses.

TSUNEICHI FUJIYAMA.

Witnesses:
   UHACHI ICHIWARAJ,
   H. F. HAWLEY.

---

Copies of this patent may be obtained for five cents each, by addressing the "Commissioner of Patents, Washington, D. C."